Feb. 2, 1965    J. W. SPRAGUE    3,168,458
ELECTROCHEMICAL CELL
Filed Dec. 27, 1961    2 Sheets-Sheet 1

INVENTOR.
JAMES W. SPRAGUE
BY Schramm, Kramer & Sturges
ATTORNEYS.

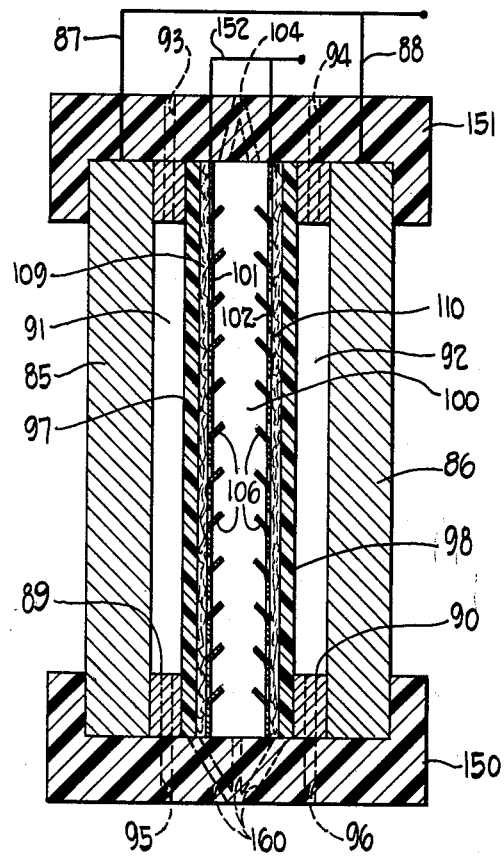

United States Patent Office 3,168,458
Patented Feb. 2, 1965

3,168,458
ELECTROCHEMICAL CELL
James W. Sprague, Streetsboro, Ohio, assignor to The Standard Oil Company, Cleveland, Ohio, a corporation of Ohio
Filed Dec. 27, 1961, Ser. No. 162,333
1 Claim. (Cl. 204—237)

This invention relates, as indicated, to an improved electrode and electrochemical reaction apparatus including the same, and more particularly to electrochemical reaction apparatus which is especially adapted for the electrochemical conversion of an electrochemical reactant material to a reaction product material.

Electrochemical oxidation and reduction reactions in various electrolyte media have heretofore been carried out in electrochemical apparatus of both the divided and undivided types. Such electrochemical reactions may or may not involve the evolution of gas at one of the electrodes. The present invention contemplates the provision of a complete cell structure of the divided type, i.e. including a barrier between the subsystems of the cell, which is especially adapted for electrochemical conversions involving the evolution of gas at at least one of the electrodes. Prior art devices have also generally been characterized by the provision of impermeable positive and negative electrodes. Present invention is particularly characterized by a perforated electrode, and more particularly a perforated electrode having guide means coacting with such electrode perforations to transfer liquid from one side of the perforated member to the other in combination with electrolyte absorbing means disposed on such other side which means are gas permeable and at the same time capable of maintaining an interfacial contact between the perforated electrode member and the electrolyte and providing a continuous internal circuit for the transport of ions to or away from the reaction interface.

The present invention may be better understood by reference to the annexed drawings wherein:

FIG. 3 is a diagrammatic illustration of another form of apparatus in accordance herewith.

Figure 1:
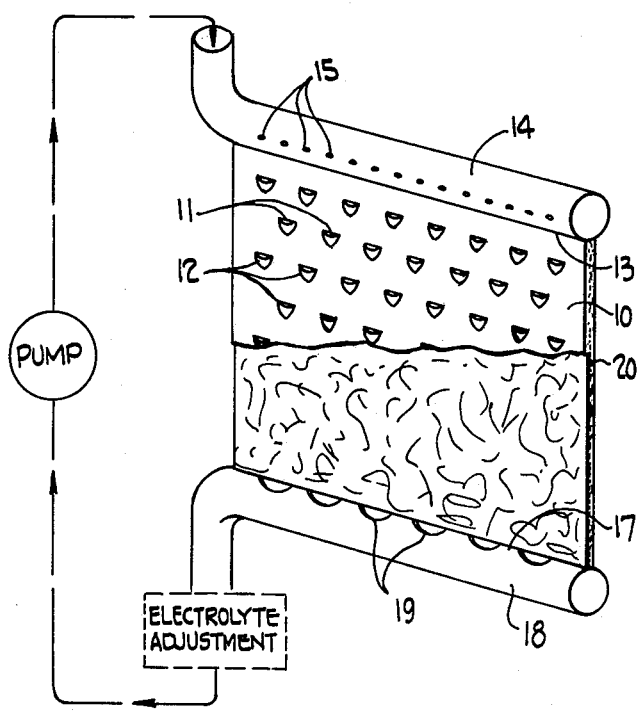
FIG. 1 is a diagrammatic illustration of a perforated electrode in accordance with the present invention.

Briefly stated, then, the present invention is in the provision of an improved electrode for use in an electrochemical reaction apparatus which includes a perforated electrone conducting member preferably of regular geometric configuration, for example, rectangular, having opposed marginal boundaries. At one marginal boundary there are provided header means for supplying an electrolyte to one surface of the member, and manifold means at an opposing marginal boundary thereof for collecting electrolyte, which has been replaced by fresh electrolyte, as well as any excess electrolyte. In order to maintain the reaction interface between the electron conducting member and an ion transfer medium which forms the internal circuit of the cell, electrolyte absorbent means are provided adjacent the electron conducting member which coact with the perforations to supply electrolyte to such interface. Circulating means are also provided which coact between the header and the manifold to pass electrolyte through the perforated electron conducting member. When electrodes of this structure are provided in an electrochemical reaction apparatus and combined with impervious electrodes which are provided with a separate ion containing and conducting medium, the two electrode-electrolyte subsystems being isolated from each other by means of an ion permeable barrier, there results a system or apparatus wherein the electrolyte adjacent the impermeable electrode may be maintained at a pressure substantially in excess of the pressure at which the perforated electrode-electrolyte subsystem is maintained. These design features enable reduced operating voltage, high conductivity, and high conversion rate. Where the barrier between the subsystems is an ion permeable resinous membrane, prolonged membrane life has been obtained.

A principal contributing factor to these advantages is the aforementioned pressure differential across the cell barrier. With the perforated electrode-electrolyte absorbent structure, the cell may be operated with an essentially empty subsystem compartment on one side and a filled subsystem compartment on the other side so that a positive pressure is provided in the direction of the essentially empty subsystem electrolyte compartment. By operating the cell with the electrode compartment essentially free of liquid, gas removal from that compartment is unimpeded. Also by using a gas permeable supporting material against the perforated electrode surface, prolonged membrane life and improved conductivity is secured. Where hydrogen is a by-product gas, the negatively charged electrode will be the electrode of the essentially empty subsystem. Where chlorine or other halogen is the by-product gas, the positively charged electrode will be the electrode of the essentially empty subsystem. The coacting subsystems in each case will be filled electrode subsystems containing the reactant material or materials.

For the purpose of this description, the apparatus for accomplishing the electrochemical conversion of an electrochemical reactant material to a reaction product will be identified as an electrochemical reaction apparatus. The electron conductors will be identified as electrodes and more specifically as the positive and negative electrodes, respectively. A medium which is capable of conducting an electrical charge associated with an atom or a group of atoms, i.e., ions, will be referred to as an ion transfer medium. The ion transfer medium serves to isolate the electronic conductors from each other in the internal circuit. The junctures between the electrodes and the ion transfer medium will be identified throughout as reactive interfaces. In the present invention, the ion transfer medium is composed of a pair of different ion containing and conducting media or electrolytes and an ion permeable membrane or barrier in intimate contact with each of said media, respectively. These media are in turn in intimate contact and form interfaces with the confronting surfaces of the electrodes. Electrical energy is supplied to the electrochemical reaction apparatus by means of an external circuit which includes a source of direct current energy, e.g. a battery.

Referring now more particularly to FIG. 1, there is here shown in diagrammatic form a perforated electrode member in accordance with the present invention. In this embodiment there is provided a perforated metallic electron conducting member 10 containing perforations 11 therethrough, and having guide portions 12 coacting therewith. The guide portions 12 are formed in the surface of the electron conducting member 10 by a stamping operation which causes a depression to be formed, such depression having a hemi-cuniform configuration whereby scoops are provided either regularly or randomly disposed on the surface to intercept liquid trickling down over the surface and to guide it from one surface to the opposite surface through the perforations 11.

The upper marginal boundary 13 of the electrode 10 is provided with a header member 14 which may conveniently take the form of a stainless steel tube as shown in FIG. 1, which tube is provided with a plurality of spaced apertures 15 adapated to permit electrolyte from the recycle system to be trickled down the adjacent surface of the electron conducting member 10. At an opposed marginal edge 17 of the electrode 10 there is provided a manifold 18 having suitable apertures 19 extending therethrough to collect spent and excess electrolyte which is accumulated at the lower marginal edge 17 of the electron conducting member.

Disposed in contacting laminar relation with the perforated metallic electron conducting member 10 is a gas and liquid permeable member 20 which may be composed of any inert highly porous materials such as fiberglass, asbestos fiber, animal fiber, vegetable fiber, synthetic fiber or the like which will soak up the electrolyte transmitted through the perforations 11 by the guides 12 and maintain the opposite surface of said electron conducting member 10 saturated with electrolyte, and at the same time will itself become saturated with electrolyte in order to provide a continuous ion-containing and conducting medium for the subsystem characterized by the presence herein of the electrode member 10. The gas permeable member 20 may be of any material having sufficient chemical stability, and a liquid permeability of at least about 100 gallons of water per min./ft.$^2$/p.s.i. At values below this, internal resistance of the cell increases undesirably.

Any conventional means for recirculating the electrolyte from the manifold means 18 back to the header means 14 may be provided. Thus, in FIG. 1 there is represented by dotted lines electrolyte adjustment means, where any corrections for deviations in concentration of electrolyte components may be made, along with pumping means for returning the electrolyte to the header 14.

Instead of a perforated metallic plate such as shown in FIG. 1, there may be used in lieu thereof a metallic electron conducting screen member which contains random or regularly spaced holes or openings which will also provide means for transmitting the electrolyte from one surface of the electron conducting member to the opposite surface by means of the absorbent electrolyte member 20. Guide means such as shown in FIG. 1 are preferred, however, while a simple metallic plate 0.008″ to 0.060″ thick, for example, such as perforated stainless steel plate, has been found quite satisfactory for use as the electron conducting member 10, metallic materials having the surface thereof which is in contact with the ion-containing and conducting medium at the reaction interface (i.e., the surface against which the electrolyte absorbent member 20 is disposed), may be activated by the deposition thereon of reaction enhancing catalytic materials and surface multiplying agents such as platinum black, nickel black, various metal oxides, etc. Metals of low hydrogen overvoltage are preferred. A useful criterion in perforate electrode design is a ratio selected such that the frontal electrode area excluding perforations, to the perforation diameter is between about 10 to 25 inches. The percent open area may range from about 10% to about 30% of the total area. These values are not critical but are convenient guides in electrode design.

Figure 2:
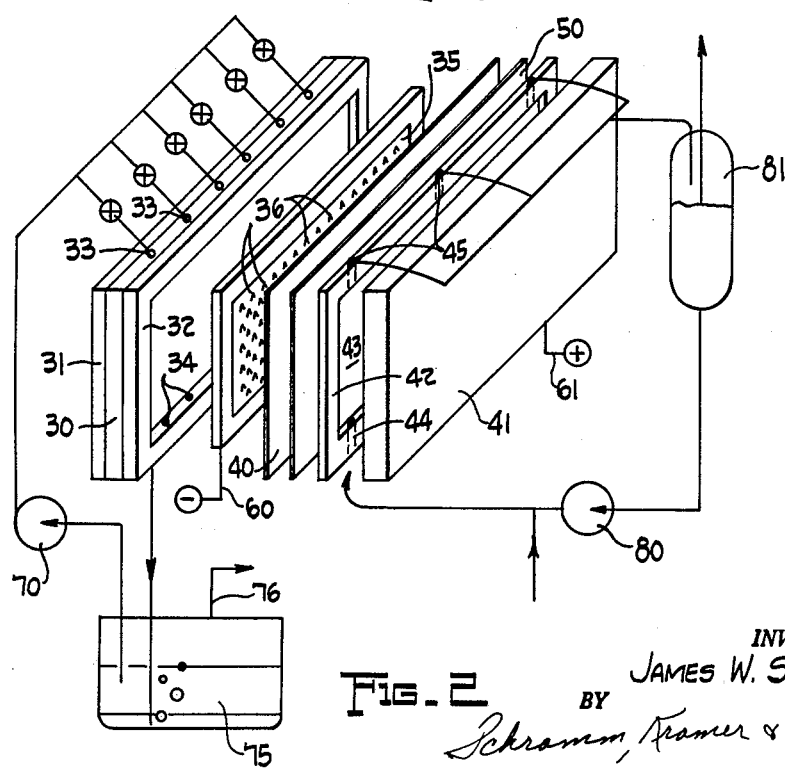
FIG. 2 is a diagrammatic exploded illustration of an electrochemical reaction apparatus in accordance herewith.

Referring now more particularly to FIG. 2, there is here shown in diagrammatic form a single cell unit in which electrochemical reactant containing material is submitted to an electrical charge to promote electrochemical reaction to form a recoverable reaction product. In the embodiment shown, the negatively charged electrode is a perforated electrode where a gas is liberated, e.g., hydrogen. As shown in FIG. 2, this apparatus conveniently takes the form of a plate and frame type laminar structure, although it will be understood that other forms of the apparatus employing the essential components hereof in the relation herein described may also be used. For example, circular plates rather than rectangular plates may be employed.

Accordingly, there is provided a frame member 30 bounded on one surface by an impermeable cover plate 31 and on the other surface by a gasket 32. The upper marginal edge of the frame member 30 as shown in FIG. 2 is provided with a plurality of inlet ports 33, and the opposite marginal boundary of the frame member 30 is provided with a plurality of openings 34 through which electrolyte may be introduced, and removed, respectively. In the embodiment shown in FIG. 2, the electron conducting member 35 is negatively charged.

The electrode 35 conveniently takes the form of a stamped metal screen of the type more clearly shown in FIG. 1 and characterized by the presence therein of perforations 36 having the guide means associated therewith such as shown at 12 in FIG. 1. The depressed portions of the guide means are disposed so as to intercept electrolyte trickling through the inlets 33 and guide it through to the opposite surface of the electrode 35. Coacting with the opposite surface of the screen-type electrode 35 is an absorbent member 40 which is conveniently formed of a filter paper web or a nylon fiber web, for example. The components thus far described in reference to the cell shown in FIG. 2 comprise the negatively charged electrode subsystem.

The positively charged electrode subsystem, as shown in this example, is composed of a solid graphite electrode 41 and a marginal gasket 42 which defines therewithin a chamber 43 adapted to contain a body of electrolyte. Electrode 41 may be porous, although the relationship of the pore size to the overall porosity of the perforated electrode-electrolyte absorbent member should be such that a positive pressure in the direction of the latter may be exerted while maintaining the subsystem including the former filled.

The subsystems above described are maintained in spaced juxtaposed relation by a barrier 50 disposed therebetween, which barrier 50 is permeable to ions, e.g., hydrogen ions, or halide ions, but impermeable to molecules.

The gasket 42 is provided with electrolyte inlet means 44 and outlet ports 45 to permit circulation of electrolyte through the positively charged electrode subsystem and in intimate contact with both the surface of the electrode 41 and the confronting surface of the barrier, or membrane 50. Suitable electrical connectors 60 and 61 are provided for the electrodes 35 and 41, respectively, to enable attachment of the cell to any suitable external source of electrical energy, e.g., a direct current battery. Also as shown in FIG. 2, separate circulatory systems are provided for each of the electrolytes. With respect to the electrolyte associated with the negatively charged electrode, circulating means such as a pump 70 is provided to circulate electrolyte through the inlet ports 33 of the frame 30 the perforations of the perforated electrode 35, and the collector manifold ports 34 and back to a storage point 75 where products of the reaction, e.g., hydrogen gas, may be removed such as shown at 76, and adjustments in the chemical constitution of the electrolyte may be made when necessary or desired.

In similar manner, the electrolyte associated with the positively charged electrode is circulated through the positive electrode subsystem by means of a pump 80 conducting fluid through the inlet ports 44 of the gasket 42 in contact with the electrode 41, and through the exits 45 to an electrolyte storage and product removal tank 81.

In the operation of the cell, the electrolyte coacting with the positive electrode is pumped into the cell through the pumping means 80, the electrochemical reactant materials being added to the stream just ahead of the pumping means 80. In a specific example utilizing the apparatus shown in the drawing, the reactant materials may be HCN and ammonium bromide. For example, the electrolyte may be an aqueous solution of 72.6% water, 2.4% HCN, and 25% ammonium bromide. An electrolyte containing these electrochemical reactants is passed through the cell and back to a constant leveling device 81. The product is removed at this point, and the remaining electrolyte returned to the positively charged electrode compartment cell. The electrolyte coacting with the negatively charged electrode (which may be a saturated aqueous solution of ammonium bromide and which may be conveniently recycled to the negatively charged electrode compartment) is fed to the upper rear of the negatively charged electrode and then trickles down the back of the electrode, penetrating the perforations and saturating the electrolyte absorbent felt material. A conductive path is thereby maintained at all times between the membrane and the electrodes. The positive pressure exerted by the electrolyte in the positively charged electrode subsystem compartment as a result of the essentially empty negatively charged electrode compartment, plus the liquid head above the cell holds the membrane firmly and evenly against the negatively charged electrode surface. This prevents lateral motion of the membrane and minimizes membrane attrition. In addition, the arrangement provides for the easy removal of gases through the porous gas permeable protective felt 40 and the perforations 11. Additional pressure differential across the cell may be provided in various ways, as for example, by means of auxiliary pumps. Vacuum may be applied to the gas electrode subsystem in order to aid in gas removal. The minimum amount of pressure required to derive the benefit associated with this type of operation is equal to the pressure drop of the gas going through the gas electrode screen. Generally less than about two pounds per square inch differential is sufficient. Maximum pressure is limited by the strength of the cell barrier member 50.

Operable pressures are dependent upon the degree of porosity and size of pores of the electrode screen and the current density which controls the amount of gas produced at the electrode surface. The inner pore distances may be increased at the expense of increased pressure differential across the cell membrane. With small inner pore distances, there is more rapid gas clearance. The use of wire gauze as an electrode construction material has been found to be particularly suitable from this standpoint because of the rapid gas removal, its effective surface and sufficient contact. With too small a pore size there is an excessive rate of gas accumulation and impractically high pressures across the cell barrier required to force the gas through the perforations and out of the cell. The resultant effect of this cell structure creates high power efficiencies. With the use of the cell separator 40 and the barrier member 50, inter-electrode distances less than those normally encountered may be utilized so that advantage can be taken of the resulting decrease in cell voltage and in the overall size of the unit. Distances as short as $\frac{1}{16}$ of an inch may be employed without danger from an internal short circuit. In addition, the pressure differential across the barrier to the gas producing electrode permits the accumulation of only a minimum amount of gas between the barrier and the perforated electrode. Since the operating voltage and the accumulation of gas in this space are in proportion, this effect too increases power efficiencies. The overall effect of this cell structure provides the maximum conductivity path between the barrier and the electrode face or the minimum operating voltage at a given current density, electrolyte concentration and temperature.

When the electrolyte in the positively charged subsystem is composed of an aqueous solution of hydrogen cyanide and ammonium bromide, and the electrolyte in the negatively charged subsystem is a saturated ammonium bromide solution, the products of the reaction are ammonia gas and hydrogen which are removed with the electrolyte from the frame 30 through the exit ports 34, and the product removed from the electrolyte in the positively charged subsystem is cyanogen bromide. With these coacting electrolytes, in an electrochemical apparatus hereof, under conditions of an impressed voltage of 3.2 volts at a current density of 100 amps per square foot, a feed rate of 49 ml. per minute for the electrochemical reactant-containing electrolyte fed to the positive electrode subsystem, an HCN conversion of 89% to cyanogen bromide and a current efficiency of 92% was obtained.

The composition of the electrodes is, of course, controlled primarily by the necessity that it be resistant to chemical reaction, such as for example, with bromine or chlorine; but a variety of materials are available which meet this requirement such as graphite, carbon, platinum, and titanium, stainless steel, etc.

Ion permeable membranes of the type which are employed to divide the electrolytic cell and separate the negative electrode subsystem from the positive electrode subsystem are conveniently those membranes which are electrically conductive and permeable to ions, but which are not permeable to molecules. The more sophisticated ion-permeable membranes are known as permselective membranes, i.e., they are permeable to ions of a given charge but not to ions having the opposite charge. Hence, they are referred to as cationic or anionic as the case may be, and both types are useful as the barrier 50 in accordance with the present invention. An example of a specific ion-exchange resin barrier is as follows:

A mixture of about 95 parts by weight of styrene and about 5 parts by weight divinyl benzene was polymerized. The resulting polymer was comminuted to fine particles and 100 parts by weight of this finely-divided material was sulfonated by reaction with about 175 parts by weight of chlorosulfonic acid. The latter reaction was carried out by heating at reflux temperature for about 3 minutes and then maintaining the mixture at room temperature for 50 hours. The sulfonated product was then washed with a large excess of water to remove any remaining chlorosulfonic acids and any acid chlorides which were formed in the reaction. The sulfonated resin was then dried and 2 parts by weight of the dried resin were mixed with 1 part by weight of polyethylene and the resulting mixture was pressed into a sheet which then serves as the membrane.

The preparation and description of permselective membranes is well known in the art and there are numerous patents relating to such membranes. Examples of such membranes are described in U.S. Patents Nos. 2,636,851; 2,636,852; 2,861,319; 2,861,320; 2,702,272; 2,730,768; 2,731,408; 2,731,411; 2,731,425; 2,732,351; 2,756,202; 2,780,604; 2,800,445; 2,820,756; 2,827,426; 2,858,264; 2,860,096; 2,860,097; 2,867,575; 2,894,289; 2,903,406; 2,957,206. Any of the membranes disclosed in the patents in the foregoing list may be employed in constructing the apparatus of the present invention. The durability of the membranes will, of course, vary depending upon their chemical composition, but this effects only the limited time which will transpire before replacement is necessary.

As for the conditions under which the cell is conveniently operated, it has been found that currents in the range of from 10 to 1,000 amperes per square foot are satisfactory and the preferred range is 30 to 500 amps per square foot. The cell may be operated at voltages in the range of 2 to 6 volts, and the preferred voltage is in the range of from about 3 to about 4. The preferred operating voltage would be dictated by externally imposed conditions as reaction specificity or economic consideration. In the electrochemical synthesis of cyanogen bromide from hydrogen cyanide, the actual voltage will be determined by the current density which is selected on the basis of economic consideration. The preferred temperature of operation is in the range of 20° to 75° C., it being understood that certain of the membranes employed as barriers are quite sensitive to temperature and consequently the upper limit of the temperature at which reaction may be carried out will usually be determined by thermostability of the membrane employed in the cell. Most membranes exhibit quite satisfactory physical stability at temperatures within the preferred range, namely, 20° to 75° C. The product of the electrochemical reaction is found in the electrolyte, and may be removed by any convenient chemical or physical means, such as distillation.

In construction of the cell, it has been found that electrolyte absorbent felt materials made from various synthetic polymeric materials such as nylon, poly(ethylene terephthalate), poly(vinyl chloride-acrylonitrile), etc. may be used. The screen materials found most suitable include 316 stainless steel screen, and "Conidure" carbon steel screen.

Referring now more particularly to FIG. 3, there is here shown another embodiment of the present invention in which an intermediately disposed perforated electrode member coacts in common with juxtaposed electrodes on either side. Thus, there is provided a pair of end-plate electrode members 85 and 86 which are conveniently impermeable graphite members, enabling such members to function both as electron conductors and as cell walls. These electrode members 85 and 86 are provided with leads 87 and 88 adapted to be connected to a positive or negative terminal of a source of direct current, not shown. Adjacent the confronting faces of electrodes 85 and 86 are gaskets 89 and 90, marginally enclosing spaces 91 and 92. Ports 93 and 94 are provided for coaction with ports 95 and 96 to permit circulation of liquid through the spaces 91 and 92 and to maintain them filled. Flow of liquid may be in either direction.

Barriers 97 and 98 are conveniently formed of a suitable permselective ion exchange resin such as has been previously described.

Intermediate barriers 97 and 98 there is provided a common electrode assembly 100 which is composed of a pair of perforated electron conducting plates 101 and 102 which may have the same composition and structure as described in connection with member 10 in FIG. 1. Inlet 104 enables supply of liquid to the confronting faces of plates 101 and 102. As with member 10 of FIG. 1, guides 106 intercept liquid flowing downwardly and transmit it through the perforations in plates 101 and 102 for absorption by electrolyte absorbent members 109 and 110. The latter are in close contact with plates 101 and 102 and with barriers 97 and 98. Absorbent members 109 and 110 may be any absorbent material in the same manner as absorbent material 20 in FIG. 1. Excess and spent liquid collected at the bottom of the chamber defined by plates 101 and 102 and marginal enclosing members 150 and 151 is exhausted from the system through suitable ports 160. Plates 101 and 102 are electrically interconnected as shown at 152 and, in turn to the terminal of opposite polarity to that to which leads 87 and 88 are connected. The nature of the electrochemical reaction occurring in the cell will determine to which pole of the direct current source the respective electrodes are attached. The electrode at which gas is evolved will be electrode 100.

In operation, the chamber defined by plates 101 and 102 and resinous marginal enclosures 150 and 151 is essentially empty and of low pressure, e.g., atmospheric pressure. Chambers 91 and 92 are filled and under a higher pressure, e.g., superatmospheric. The resulting pressure differential forces membranes 97 and 98 in a direction which compresses the absorbent members 109 and 110 against plates 101 and 102 and improves the efficiency of the cell as previously described.

A plurality of cell units may be assembled with marginal enclosures together with suitable plumbing for interconnecting the appropriate subsystems for series or parallel fluid flow therethrough.

There has thus been provided an electrochemical reaction apparatus which is especially adapted for the oxidation and reduction of organic compounds. The cell consists essentially of a positively charged electrode subsystem, a negatively charged electrode subsystem and ion permeable barrier isolating the subsystems, respectively, a protective felt backing for electrode at which gas is evolved and a perforated electron conducting member. The design features of this cell provide for minimum operating voltages and maximum conductivity and prolonged membrane life. Removal of gas from the electrode is enhanced by provisions which enable operation of the cell at pressures in the respective subsystems which are different resulting in a differential pressure across the cell. This differential may be achieved by operating the cell with an essentially empty compartment and a filled electrode compartment so that positive pressure is in the direction of the electrode where gas formation is occurring. By operating the cell with the one electrode compartment essentially free of liquid, gas removal from that electrode is unimpeded.

Other modes of applying the principle of this invention may be employed instead of those specifically set forth above, changes being made as regards the details herein disclosed provided the elements set forth in the following claim, or the equivalent of such be employed.

It is, therefore, particularly pointed out and distinctly claimed as the invention:

The electrochemical reaction apparatus comprising in combination in a housing a solid electrode plate impermeable to liquid, a perforated metallic electrode plate including perforations having guide means integral therewith for guiding downwardly flowing fluid from the side of said plate away from the solid electrode to the opposite surface of said plate, said plates being in spaced parallel relation in said housing, and an ion transfer medium including a liquid impermeable barrier of an ion exchange resin, said barrier having electrolyte absorbent means in laminar relation therewith and in contatcing relation with said perforated plate said electrolyte absorbent means consisting of electrolyte absorbent fibrous material; said barrier means being disposed intermediate said electrode plates and in spaced parallel relation to said electrode plates, means for supplying a liquid electrolyte to the space between said barrier and said impermeable electrode plate said means marginally enclosing the space between barrier and said impermeable electrode plate and having a liquid inlet port and a liquid outlet port therein; means for supplying a different liquid electrolyte to one side of said perforated electrode plate including manifold means disposed along the upper marginal edge of said perforated electrode plate said manifold having perforations through the side wall thereof disposed for passing liquid therethrough and into contact with one of the vertical faces of said perforated electrode plate; manifold means adjacent the lower marginal edge of said perforated electrode plate including perforations through the side wall thereof communicating with the vertical faces of said perforated electrode plate and adapted to receive liquid electrolyte cascading over the surface of said perforated electrode plate; and means coacting with each of said manifold means for recirculating the said electrolyte through said perforated electrode plate said means including chemical treatment means for adjusting the concentration of electrochemical reactant materials in said electrolyte.

References Cited in the file of this patent

UNITED STATES PATENTS

| | | |
|---|---|---|
| 1,006,836 | Farnham | Oct. 24, 1911 |
| 1,771,091 | Lawaczeck | July 22, 1930 |
| 2,691,628 | Aannerud | Oct. 12, 1954 |
| 2,794,777 | Pearson | June 4, 1957 |
| 2,987,472 | Kollsman | June 6, 1961 |
| 3,084,113 | Vallino | Apr. 2, 1963 |

FOREIGN PATENTS

| | | |
|---|---|---|
| 75,033 | Germany | June 27, 1894 |
| 1,024,890 | France | Apr. 8, 1953 |